United States Patent [19]

Salners

[11] 3,781,730

[45] Dec. 25, 1973

[54] YOKE MOUNTING RING WITH DEFORMABLE FINGER MEMBERS

[75] Inventor: Edward A. Salners, Mount Prospect, Ill.

[73] Assignee: Motorola, Inc., Franklin Park, Ill.

[22] Filed: Nov. 29, 1972

[21] Appl. No.: 310,526

[52] U.S. Cl. .................................. 335/210, 248/205
[51] Int. Cl. .................................................. H01f 7/00
[58] Field of Search ............................ 335/210, 212; 248/205

[56] References Cited

UNITED STATES PATENTS

| | | | |
|---|---|---|---|
| 3,361,403 | 1/1968 | Oeler et al. | 248/205 |
| 3,404,228 | 10/1968 | McLeod, Jr. et al. | 335/210 X |
| 3,408,520 | 10/1968 | Lindman | 335/212 X |
| 3,497,843 | 2/1970 | Collie, Jr. | 335/210 |
| 3,637,930 | 1/1972 | Meier | 335/210 X |

*Primary Examiner*—George Harris
*Attorney*—Vincent J. Rauner et al.

[57] ABSTRACT

A ring mounting device for receiving a deflection yoke and maintain the same in a fixed, selectively adjusted position on the neck of a cathode ray tube. The mounting ring includes a plurality of fingers extending therefrom for physical attachment to the bell portion of the cathode ray tube, such as by an adhesive tape or the like. The entire mounting ring is constructed in a one-piece molded configuration from a plastic, non-metallic material so as to avoid static-charge buildup. Additionally, the associated finger members are deformable so as to accomodate the size requirements of substantially any cathode ray tube.

6 Claims, 5 Drawing Figures

PATENTED DEC 25 1973

3,781,730

YOKE MOUNTING RING WITH DEFORMABLE FINGER MEMBERS

BACKGROUND OF THE INVENTION

The present invention relates in general to mounting apparatus and more particularly to an improved ring mounting device for maintaining a deflection yoke of a television receiver in a selected position on the neck of a cathode ray tube in a simple, but reliable manner, which ring device is free of static-charge buildup and, further, capable of accomodating the size requirements of any cathode ray tube.

In a conventional television receiver, the associated deflection yoke, usually in the form of an inverted cone arrangement, must be received on the neck portion of the cathode ray tube with the open, flared-out portion thereof adjacent to and in substantial conformity to the bell-shaped funnel portion of the cathode ray tube.

Both color and monochrome television receivers require deflection or field reproducing apparatus selectively disposed about the neck portion of the receiver's cathode ray tube for effecting suitable deflection and control of the electron beam or beams. The tube neck is of course made as short as possible to help minimize the size of the overall cabinet enclosure. This creates somewhat of a problem, however, particularly in color television receivers where additional field producing correctors and other control apparatus is required.

In the conventional three-gun, shadow-mask cathode ray tube, convergence apparatus is required for static and dynamic convergence of the electron beams and, customarily, a blue lateral positioning device, as well as several purity magnets. This is in addition to the required deflection yoke assembly. For optimum color purity, the entire deflection yoke assembly must be precisely adjusted in location to determine the correct deflection center for the electron beams. This is effected by sliding the deflection yoke assembly toward and away from the tube funnel or bell-shaped portion as the specific need demands. Once correctly adjusted, the yoke assembly must then be secured firmly in that selected but fixed position. However, the other beam control apparatus must remain readily accessible for selective adjustment, but mounted in a manner so as not to shift position once correctly adjusted.

Apparatus for mounting deflection yoke apparatus are of course known in the art. However, for the most part, such prior art devices have heretofore been characterized by their undue compexity as well as the relatively high cost of fabrication. More recently, greatly simplified yoke mounting ring arrangements have been devised, such as for example, that set forth in Oeler et al. U.S. Pat. No. 3,361,403. The structure as disclosed therein nevertheless exhibits certain disadvantages. It is fabricated of a lightweight metal, namely aluminum, and is therefore subject to static-charge buildup which must be neutralized or shunted to a suitable reference plane, or ground. In addition, it is fabricated in a particularized physical configuration and thus will accommodate only a given size of cathode ray tube structure, or at best a severely limited range of cathode ray tube sizes.

Accordingly, it is an object of the present invention to provide an improved yoke mounting ring device for maintaining a deflection yoke assembly for a cathode ray tube in a selectively adjusted axial position.

A more particular object of the present invention is to provide a yoke mounting ring device of the foregoing type of a substantially simplified mechanical arrangement, easily and quickly mounted to an associated cathode ray tube which is free of troublesome static-charge buildup.

A further object of the present invention is to provide a yoke mounting ring device of the foregoing type which will accomodate the size requirements and physical configuration of substantially any cathode ray tube.

In one particular embodiment of the invention, a mounting ring arrangement is provided for receiving a portion of a deflection yoke assembly. The ring and deflection yoke assembly may then be inserted over the neck of the television receiver's picture or cathode ray tube. The ring assembly includes a plurality of finger members extending laterally therefrom and which are intended to be affixed to the funnel or bell-shaped portion of the cathode ray tube such as by a two-side adhesive tape or the like. The referenced finger members, however, are constructed of a shape and material to be readily deformable so that they may be selectively deformed to accomodate the precise size requirements and physical configurations of a wide variety of cathode ray tubes. The fingers, when secured to the tapered walls of the picture tube, serve to properly align the mounting ring and yoke assembly with respect to the tube neck. The ring itself has a gap in the peripheral wall so as to permit the effective diameter to be varied when desired. Fastening means are positioned across the gap which when properly secured clamps a portion of the yoke assembly in the selected position and thereby prevents further rotational and sliding movement within the ring. When loosened, the yoke may be adjusted to any selected position longitudinally along and rotationally about the neck portion of the cathode ray tube. A second clamp arrangement at the end remote from the tube funnel further serves to maintain the mounting ring and associated yoke assembly in its selected position.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description when taken in conjunction with the accompanying drawings, and the several figures of which like numerals identify like elements and in which:

DESCRIPTION OF THE PREFERRED EMBODIMENT

Figure 1:
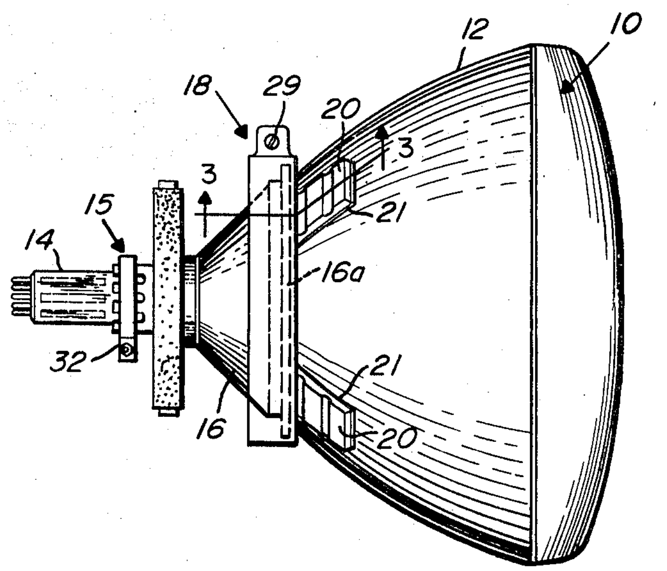
FIG. 1 is a side elevational view of a cathode ray tube on which a mounting ring and yoke assembly is included in accordance with the present invention.

Referring now to the drawings, FIG. 1 shows a shadow-mask type cathode ray tube 10 of the type conventionally suited for use in color television receivers and having a bell-shaped portion or funnel 12 at one end and a reduced neck portion 14 at the other. A deflection yoke assembly 15 is mounted on the tube 10 and maintained in a selected position at its forward end by the yoke mounting ring 18, as shown. The yoke assembly 15 includes a deflection yoke 16 with an annular portion 16a which is received within the ring 18 and maintained in a coaxial relation therewith. A plurality of tabular finger members 20 extend radially outwardly from the mounting ring 18 at various selected locations. These finger members 20 are shown to have substantially the same angle as the curvature of the walls of the cathode ray tube 10. The finger members 20 are intended to be affixed to the cathode ray tube 10, by a suitable fastening means. In one arrangement found satisfactory, a two-sided adhesive tape such as shown at 21 is used to secure the fingers to the cathode ray tube surface portion 12. The tape is of sufficient thickness and fabricated of a suitably resilient material to form an effective cushion between the fingers 20 and surface 12 of the cathode ray tube 10.

Figure 2:
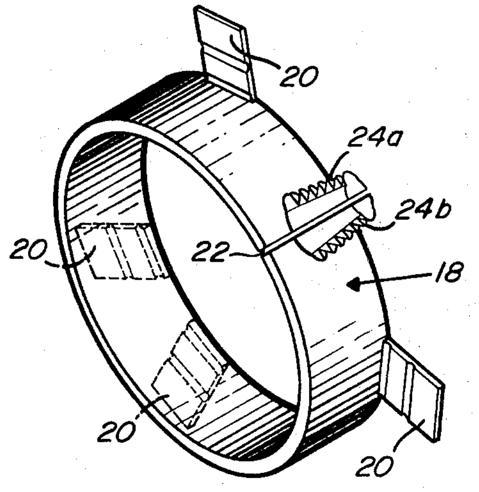
FIG. 2 is a front elevational view in perspective of the mounting ring of FIG. 1.
Figure 4:
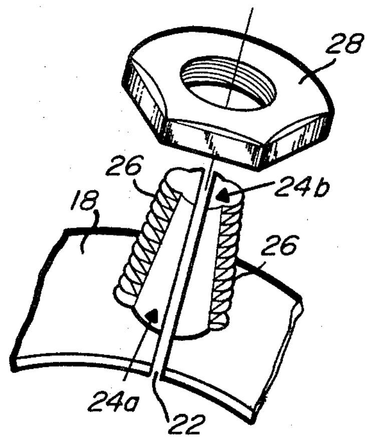
FIG. 4 is an enlarged fragmentary view in perspective of a portion of the locking arrangement for the mounting ring in FIGS. 1 and 2.

As best seen in FIG. 2, the mounting ring 18 is essentially a circular band with an opening or gap 22 provided in the peripheral wall at the top thereof. Upstanding tubular members 24*a* and 24*b* extend upwardly on respective sides of the gap 22. In one embodiment, and as best seen in FIG. 4, tabular members 24*a* and 24*b* are formed in a tapered, half-moon configuration. When the vertical interfaces abut one another, an essentially conical shape is presented which tapers or reduces in diameter towards the top. Screw threads 26 are provided along an outside vertical surface of each of the tabular members 24*a* and 24*b*. These threads are adapted to cooperate with an associated locking nut 28. As the locking nut 28 is screwed downwardly on threads 26, the taper of the members 24*a* and 24*b* cause them to close the gap 22 and securely lock the mounting ring 18 in its fixed, closed position.

Figure 5:
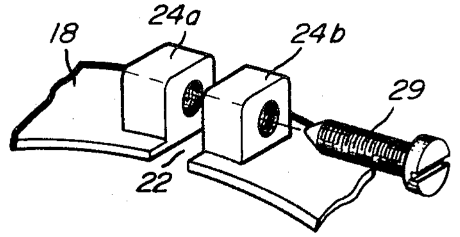
FIG. 5 is an enlarged fragmentary view in perspective of still another locking arrangement for use with the mounting ring.

Still another locking arrangement for the mounting ring 18 is shown in FIG. 5. In this embodiment, essentially rectangular members 24'*a* and 24'*b* are positioned across respective sides of the gap 22. A machine screw 29 or the like is received in associated threaded and aligned openings 27 in the rectangular tabular members 24'*a* and 24'*b*, as shown, to lock the respective ends of the mounting ring together as previously described.

Figure 3:
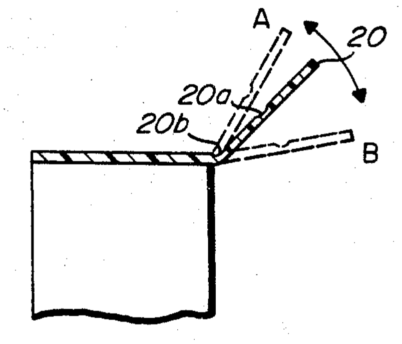
FIG. 3 is an enlarged fragmentary view in cross section of a deformable finger member as taken along line 3—3 in FIG. 1.

An important aspect of the present invention pertains to the fabrication of the mounting ring 18 as to both its physical configuration and the materials used. In the past, where the prior art devices have been totally or at least partially constructed of a metallic substance, a static charge is developed because of the substantially high voltages involved and the capacitive storage effect produced by the cathode ray tube 10. Accordingly, suitable provision must be made to remove such charge to a safe reference plane, such as ground. Additionally, such prior art devices were intended to accomodate only a particular size of cathode ray tube, or at least a relatively narrow range of tube sizes. A yoke mounting ring in accordance with the present invention, such as shown in 18 in FIGS. 1 and 2, effectively obviates both of these difficulties. First, the mounting ring 18 is formed or molded in a one-piece configuration from a nonmetallic plastic material, for example, polypropolene. Since it is non-metallic, it is not susceptible to the otherwise troublesome static charge buildup. Secondly, the finger members 20 are formed with a pair of grooves or channels 20*a* and 20*b* running laterally across their top or surface opposite that which contacts the cathode ray tube. These grooves, in combination with the plastic material comprising the ring apparatus, permits the finger members 20 to be conveniently deformed to fit the curvature presented by the walls of substantially any size cathode ray tube. As shown in FIG. 3, the finger members may be bent to any desired position, such as between the indicated positions "A" and "B," with the groove 20*b* acting as the pivot axis. The fingers 20 may be further bent about the groove 20*a* if determined as necessary.

In practicing the invention, the mounting ring 18 is inserted over the neck of the cathode ray tube 10 and the finger members 20 suitably adjusted to accomodate the curvature or size requirements of the walls forming the funnel portion 12. The fingers 20 are secured thereto such as the previously described two-sided adhesive tape 21. Such tape should be sufficiently thick and resilient to serve as a cushion between the fingers 20 of ring 18 and the walls forming the funnel portion 12 of tube 10 so as to reduce the possibility of subsequent tube damage.

Following the securement of ring 18 to the funnel portion 12, the yoke assembly 15 may be inserted over the neck of the tube 10 and moved to a position where the annular portion 16*a* of deflection yoke 16 is suitably fitted within ring 18. The locking nut 28 or screw 29 should be detached or at least sufficiently loosened to permit the insertion of yoke 16 into the mounting ring 18. A further clamping arrangement 32 at the end of yoke assembly 15 remote from the funnel portion 12 which when tightened down cooperates with the mounting ring 18 to hold and maintain the yoke 16 in the desired, fixed position. Prior to securing the ring 18 and clamp 32, however, the yoke 16 must be properly adjusted. That is, it must be moved in an axial direction to and fro along the neck of the tube 10, as well as rotated thereabout, until the correct center of deflection for the electron beam is properly located. When this is accomplished, the ring 18 may be securely fastened about the annular portion 16*a* at the front end of yoke 16, while the clamp 32 upon being tightened down firmly secures the other end of yoke assembly 15 to the neck 14 of tube 10.

What has been described therefore is an improved apparatus for mounting a yoke to a cathode ray tube that is simple and relatively inexpensive to manufacture and assemble. The apparatus is not susceptible to static charge buildup and further is designed to accomodate any size of cathode ray tube. Further, the apparatus permits the yoke to be adjusted after it is mounted to the tube and then secured in place.

What is claimed is:

1. Ring mounting apparatus for mounting a deflection yoke assembly to a cathode ray tube having a neck portion and a bell-shaped funnel portion adjacent thereto, said mounting apparatus including in combination:

a support frame for receiving a portion of the deflection yoke assembly therein and permit the same to be slidably and rotatably positioned along and about the neck portion of the cathode ray tube;

said support frame being fabricated of a nonmetallic, plastic material in a one-piece molded configuration and further including a plurality of finger members extending radially outward therefrom, said finger members being deformable to a selectable configuration to accomodate the curvature and size requirements of substantially any cathode ray tube;

means securing said fingers to the bell-shaped funnel portion of the cathode ray tube; and clamping means cooperating with said support frame to selectively prevent the yoke assembly from rotating and sliding within said support frame and with respect to the cathode ray tube.

2. The mounting apparatus in accordance with claim 1 wherein said support frame is in the form of an annular ring having a gap therein to vary the effective diameter of the mounting ring and accept yoke assemblies of varying sizes, and wherein said clamping means includes fastening means for joining said mounting ring at said gap to lock the yoke assembly in a selected, fixed position.

3. A mounting apparatus in accordance with claim 2 wherein said fastening means includes complementary upstanding tabular members on respective sides of said gap, said members being tapered and having threadable portions along outside vertical surfaces, and wherein lock nut means cooperates with said threaded tabular members to effect the clamping action of said ring about said yoke assembly.

4. A mounting apparatus in accordance with claim 2 wherein fastening means includes complementary upstanding tabular members on respective sides of said gap, said members having coaxially aligned apertures therein for receiving screw means and effecting the clamping action for said ring about said yoke assembly.

5. The mounting apparatus in accordance with claim 1 wherein said finger members include at least one grooved channel extending laterally across the surface thereof to facilitate bending said finger members at that juncture and to conform to the required tube configuration.

6. A mounting apparatus in accordance with claim 1 wherein said means for securing said finger members to the cathode ray tube includes a double-coating adhesive tape which further serves as a cushion between said fingers and the cathode ray tube.

* * * * *